United States Patent Office 2,761,877
Patented Sept. 4, 1956

2,761,877

PRODUCTION OF PHENOLS AND CARBONYL COMPOUNDS

Michel Marius Mosnier, Lyon, France, assignor to Societe des Usines Chimiques Rhone Poulenc, Paris, France No Drawing. Application May 13, 1952,
Serial No. 287,615

Claims priority, application France May 17, 1951

11 Claims. (Cl. 260—593)

This invention is for improvements in or relating to the simultaneous production of phenols and carbonyl compounds. It is known to decompose the hydroperoxides of cumene and its alkyl aromatic homologues by means of substances having an acid reaction, the fission products being a phenolic compound and a carbonyl derivative, which is either an aldehyde or a ketone according to the particular hydroperoxide concerned.

Hock and Lang (Berichte der Deutschen Chemischen Gesellschaft, vol. 77, p. 257, 1944) effected a fission of this type by heating cumene hydroperoxide for an hour and a half with about 12 times its weight of 10% sulphuric acid and thus obtained phenol and acetone in a good yield.

It was subsequently proposed to improve the phenol yield by employing a sulphuric acid having a concentration by weight of between 10% and 70% in a quantity at least equal to that of the cumene hydroperoxide, the latter being employed either as such or in the form of its sodium salt, or in solution in an organic solvent which could be, for example, the cumene in which it had been obtained by oxidation. In most cases, the reaction mixture consists of two immiscible phases, one aqueous and the other organic, and as any person skilled in the art will appreciate, such a reaction mixture involved manipulative difficulties. In addition, in the particular case under present consideration, the two fission products are soluble both in the aqueous phase and in the organic phase, whence it follows that both phases must be treated in order to obtain optimum yield of the two products.

It has also been proposed to effect fission of cumene hydroperoxide under substantially anhydrous conditions. Such a method enables the reaction to proceed in a homogeneous medium, but it necessitates the use of particular catalysts and in any case excludes the use, as catalyst, of aqueous sulphuric acid, which is one of the most active and economical catalysts for the fission reaction.

It is the object of the present invention to provide an improved process for the fission of the hydroperoxides of cumene and other homologous alkyl-aromatic hydrocarbons which does not involve the aforesaid disadvantages.

The process of the present invention is essentially characterised by bringing the hydroperoxide and sulphuric acid into contact at elevated temperature in the presence of the phenol which is formed in the fission reaction, this phenol being introduced before the commencement of the reaction. It has been found that, under these conditions, the quantity of sulphuric acid required to bring about the reaction may be substantially reduced such that it is a preferred embodiment of the invention to employ as catalyst a quantity of aqueous sulphuric acid which is soluble in a reasonable quantity of the said phenol and thereby ensure a homogeneous reaction medium.

The hydroperoxides to which the process is applicable are cumene hydroperoxide and the hydroperoxides of alkyl-aromatic derivatives which are homologues of cumene, the alkyl group of these hydroperoxides containing a secondary or tertiary carbon atom. Those homologues in which the hydroperoxide function is attached to a tertiary carbon atom of the alkyl group are, for example, the hydroperoxides of p-cymene, secondary butylbenzene and di-isopropylbenzene. An example of a homologue of cumene hydroperoxide in which the hydroperoxide function is attached to a secondary alkyl carbon atom is ethylbenzene hydroperoxide. The fission of these homologues takes place in accordance with the same reaction scheme as for cumene hydroperoxide and yields the aliphatic ketone or aldehyde corresponding to the alkyl group of the starting material (being a ketone when that alkyl group contains a tertiary carbon atom or an aldehyde when the alkyl group contains a secondary carbon atom) together with the phenol corresponding to the aromatic nucleus, which may be substituted according to the nature of the hydroperoxide starting material. Thus, the hydroperoxide of p-cymene gives p-cresol and acetone; the hydroperoxide of secondary butylbenzene gives phenol and methylethyl ketone; and the hydroperoxide of ethylbenzene gives phenol and acetaldehyde.

In carrying the process of the present invention into effect, the hydroperoxide may be previously admixed with the corresponding phenol before being reacted with the sulphuric acid, but it is usually more convenient to bring the sulphuric acid and the hydroperoxide into contact by simultaneous addition to a hot mass of liquid phenol. In the following description such mass will, for the sake of brevity, be termed a "foot."

It has been found that under these conditions very small proportions of sulphuric acid, i. e. proportions of the order of 1% to 5% by weight (expressed in terms of pure acid) in relation to the cumene hydroperoxide, are sufficient to produce almost instantaneous fission of the hydroperoxide. This small quantity of sulphuric acid which may be used in, for example, a concentration of 30%–75% by weight, is completely soluble in the "foot" so that the process of the invention in its preferred embodiment comprises a reaction medium which is homogeneous from the outset and which remains so even with the subsequent addition of further quantities of acid and hydroperoxide. It is not necessary for the "foot" to consist of pure phenol, but a phenol may be employed which has been obtained from an earlier fission operation and which still contains a small quantity, for example, less than 10%, of the carbonyl compound which has been simultaneously formed.

It is also unnecessary to employ an absolutely pure cumene hydroperoxide, since there may be employed a crude product which results from the partial oxidation of cumene, after such product has been freed from the greater part of the excess of unconverted hydrocarbon by distillation and/or steam distillation. In the case of cumene, a product obtained under these conditions and containing, for example, 5% of cumene and 5% of water is quite suitable for carrying out the process according to the invention with the use of a 70% sulphuric acid solution. It is to be noted that the figure of 5% for the content of water and of cumene in the crude hydroperoxide respectively, is hereinbefore referred to only by way of example. A higher cumene content can be tolerated in the case of a hydroperoxide containing less water, for example 10% of cumene, for a completely anhydrous hydroperoxide. However, it is desirable, with a view to deriving the greatest advantage from the invention and in particular to working in a practically homogeneous medium, to use hydroperoxides of good purity such as those specifically described in the following examples.

The process is advantageously carried out at a temperature which is preferably lower than 65° C. in order to avoid any side reaction between the sulphuric acid and the fission products. The operation may be continously performed by bringing into contact corresponding quantities of hydroperoxide and of acid as hereinbefore indicated for cumene, in a "foot" consisting of the phenol. The rate at which the reagents are introduced depends only upon the extent to which it is possible under the conditions employed to remove, by cooling, the heat liberated by the fission reaction. A volume of the reaction mixture equal to that of the reagents introduced is continuously removed from the reaction apparatus and is suitably treated to separate the desired products therefrom. If desired, the operation can be conducted under temperature and pressure conditions such that the carbonyl derivative formed in the reaction is substantially eliminated in the proportion in which it is formed.

The phenol and ketone (or aldehyde) yields obtained by the process of the present invention are at least equal to but are generally greater than those obtained in the known processes.

The advantages afforded by the process according to the invention, in its preferred embodiment, as compared with the known processes, include the following: Owing to the homogeneity of the reaction medium, only a moderate agitation is required in bringing the reagents into contact; owing to the small quantity of sulphuric acid employed, the economy of the process does not necessitate the re-use of this reagent as in the earlier processes; the almost instantaneous nature of the reaction, due to the solubility of the sulphuric acid in the phenol, eliminates the danger of delays followed by violent reaction; and secondary reactions are minimised.

In the following examples, in which the parts and percentages are by weight except where otherwise indicated, methods of carrying the invention into effect are described by way of non-limitative example. When parts by volume are mentioned, they are in the same proportion to the parts by weight as litres to kilograms.

*Example I*

59 parts of phenol are introduced into a vessel provided with an agitator and cooling means. It is heated to 45° C. and 45 parts by volume of 50% sulphuric acid and 1100 parts by volume of crude cumene hydroperoxide (titer 87.5%—water content 4.3%; cumene content 1.5%), obtained by distillation followed by steam distillation of a solution of hydroperoxide in cumene, are simultaneously run in per hour. At the start of the reaction, the running-in of the sulphuric acid is slightly advanced in order to avoid any delay in initiating the fission. The temperature rises and is maintained at 49°–50° C. by cooling. The content of cumene hydroperoxide in the fission mixture does not exceed 0.5%. The reaction mixture passes continuously into a second vessel, also maintained at 49°–50° C., where the reaction is completed, the content of cumene hydroperoxide in the fission mixture then being less than 0.1%.

The fission reaction is very rapid. The length of stay of the reaction mixture in the two reactors is a function of the surface and of the cooling power in each. The volume of the plant and consequently the weight of the reaction mass for the same product may therefore vary considerably. Generally speaking, the best results are obtained by working under conditions favouring speed of reaction.

The fission mixture then passes into a third vessel in which the acid is continuously neutralised. For this purpose, 13% aqueous caustic soda solution is continuously run in while the neutrality is tested with Methyl Red indicator (about 220 parts per hour). This vessel is maintained at 30° C. so as to ensure maximum solubility of the sodium sulphate formed. The liquid passes from this third vessel into a decanter in which an aqueous layer of sodium sulphate solution and an organic layer are separated. The organic layer is first distilled under normal pressure, when at between 55° and 93.5° C. the acetone distils off. Thereafter, under a pressure of 150 mm. of mercury and at a temperature of up to 126° C. an intermediate fraction containing methyl-styrene convertible into cumene by hydrogenation is separated. The pressure is then reduced to 27 mm. and the phenol is distilled off at a temperature between 87° and 91° C., whereafter tailings containing a little phenol and aceto-phenone are similarly removed.

The yields calculated on the weight of cumene hydroperoxide employed are 94%–96% of distilled phenol and 95% of distilled acetone.

*Example II*

In an apparatus provided with agitating means, a cooling system and a distillation tube connected to a coolant cooled to —15° C. by means of brine, a vacuum is progressively set up until a pressure of 90 to 100 mm. of Hg is obtained. 50 parts of phenol and 1.5 part of 55% sulphuric acid are then run into the apparatus. The mixture is heated to 55° C., whereafter 1000 parts of 99% cumene hydroperoxide and 30 parts of 55% sulphuric acid are simultaneously and continuously run in per hour. The cumene hydroperoxide is split into phenol and acetone. The heat evolved by the fission reaction is absorbed partly by distillation of the acetone formed and partly by cooling the apparatus. The acetone liberated is condensed by the brine-cooled coolant. In this way, the greater part of the acetone formed is recovered. The mixture of phenol and sulphuric acid containing less than 10% acetone is continuously extracted from the apparatus. The sulphuric acid is neutralised and the product is distilled in the usual way.

The yield of acetone extracted relative to the amount of hydroperoxide employed is 95%. The phenol yield varies from 92% to 97% according to the quality of cumene hydroperoxide.

*Example III*

49 parts of p-cresol are introduced into a vessel provided with an agitator and cooling means. It is heated to 40° C. and 13 to 25 parts of 50% sulphuric acid and 1100 parts of p-cymene hydroperoxide containing 86% of pure hydroperoxide, obtained by concentration of a solution of hydroperoxide in p-cymene, are simultaneously run in per hour. The temperature rises but is maintained at 45°–50° C. by cooling. The reaction is completed in a second vessel maintained at the same temperature. The content of p-cymene hydroperoxide is then less than 0.1%. The fission mixture passes into a third vessel in which the sulphuric acid is neutralised by running in a 13% aqueous caustic soda solution until neutrality to Methyl Red is attained. The mixture is then decanted and fractionated. There are obtained p-cresol and acetone in a yield of 80%.

*Example IV*

The procedure of Example III is followed, the cresol being replaced by phenol and the p-cymene hydroperoxide being replaced by secondary butylbenzene hydroperoxide containing 82% of pure hydroperoxide. Phenol and methylethyl ketone are obtained in a yield of 89%.

I claim:

1. A process for the production of phenols and carbonyl compounds by the decomposition by means of sulphuric acid of a hydroperoxide of an alkyl aromatic hydrocarbon in which at least one alkyl substituent contains more than 2 carbon atoms and has only one hydrogen atom attached to the carbon atom which is directly attached to the aromatic nucleus, wherein the hydroperoxide and the sulphuric acid are introduced simultaneously but separately, at elevated temperature, into a medium consisting essentially of the phenol to be formed in the reaction, said phenol being introduced before the reaction has commenced and the reaction medium being homogeneous.

2. A process according to claim 1 in which the reaction is initiated in a liquid mass of the said phenol free from the carbonyl compound also formed in the fission reaction.

3. A process according to claim 1 wherein the hydroperoxide contains not more than a total of about 10% by weight of the hydrocarbon from which it is derived and of water.

4. A process according to claim 1 wherein the reaction is effected at a temperature less than 65° C.

5. A process for the production of phenols and carbonyl compounds by the decomposition by means of sulphuric acid of a hydroperoxide of an alkyl aromatic hydrocarbon in which at least one alkyl substituent contains more than 2 carbon atoms and has only one hydrogen atom attached to the carbon atom which is directly attached to the aromatic nucleus, wherein the substantially pure hydroperoxide and sulphuric acid are introduced simultaneously but separately, at elevated temperature, into a medium consisting essentially of the phenol to be formed in the reaction, the acid being employed in the form of an aqueous solution containing from 1 to 5% by weight of pure acid based upon the hydroperoxide employed and the quantity of the phenol present being at least sufficient to dissolve the aqueous acid, whereby the reaction medium is homogeneous.

6. A process for the production of phenols and carbonyl compounds by the decomposition by means of sulphuric acid of a hydroperoxide of an alkyl aromatic hydrocarbon in which at least one alkyl substituent contains more than 2 carbon atoms and has only one hydrogen atom attached to the carbon atom which is directly attached to the aromatic nucleus, wherein the substantially pure hydroperoxide and sulphuric acid are introduced simultaneously but separately, at elevated temperature, into a medium consisting essentially of the phenol to be formed in the reaction, said medium being free from the carbonyl compound also to be so formed, said phenol being introduced before the reaction commences, the acid being employed in the form of an aqueous solution containing from 1 to 5% by weight of pure acid based upon the hydroperoxide employed and the quantity of the phenol present being at least sufficient to dissolve the aqueous acid, whereby the reaction medium is homogeneous.

7. A process for the production of phenols and carbonyl compounds by the decomposition by means of sulphuric acid of a hydroperoxide of an alkyl aromatic hydrocarbon in which at least one alkyl substituent contains more than 2 carbon atoms and has only one hydrogen atom attached to the carbon atom which is directly attached to the aromatic nucleus, wherein the hydroperoxide and the sulphuric acid are introduced simultaneously but separately, at elevated temperature, into a medium consisting essentially of the phenol to be formed in the reaction, said phenol being introduced before the reaction has commenced, the hydroperoxide and the acid are simultaneously and continuously run into a heated mass of the said phenol, the temperature of the homogeneous reaction mixture is maintained below 65° C., and the fission products are continuously removed at a rate such as to maintain substantially constant the volume of the reaction mixture.

8. A process for the production of p-cresol and acetone by the decomposition of p-cymene hydroperoxide when effected in the manner set forth in claim 7.

9. A process for the production of phenol and methylethyl ketone by the decomposition of secondary butylbenzene hydroperoxide when effected in the manner set forth in claim 7.

10. A process for the production of phenols and carbonyl compounds by the decomposition by means of sulphuric acid of a hydroperoxide of an alkyl aromatic hydrocarbon in which at least one alkyl substituent contains more than 2 carbon atoms and has only one hydrogen atom attached to the carbon atom which is directly attached to the aromatic nucleus, wherein the hydroperoxide and the sulphuric acid are introduced simultaneously but separately, at elevated temperature, into a medium consisting essentially of the phenol to be formed in the reaction, said phenol being introduced before the reaction has commenced, the hydroperoxide and the acid are simultaneously and continuously run into a heated mass of the said phenol, the temperature of the homogeneous reaction mixture is maintained below 65° C., and the carbonyl fission product is continuously removed from the reaction mixture in gaseous form so that the content of said carbonyl fission product in the reaction mixture at no time exceeds 10% by weight.

11. A process for the continuous production of phenol and acetone by the decomposition by means of sulphuric acid of cumene hydroperoxide wherein the hydroperoxide and the acid are simultaneously and continuously run into a heated mass consisting essentially of phenol, the temperature of the homogeneous reaction mixture is maintained below 65° C., and the acetone is continuously removed in gaseous form so that the acetone content of the reaction mixture at no time exceeds 10% by weight.

References Cited in the file of this patent

UNITED STATES PATENTS

| | | |
|---|---|---|
| 2,628,983 | Aller et al. | Feb. 17, 1953 |
| 2,661,375 | Conner | Dec. 1, 1953 |
| 2,663,735 | Filar et al. | Dec. 22, 1953 |

FOREIGN PATENTS

| | | |
|---|---|---|
| 629,429 | Great Britain | Sept. 20, 1949 |